(12) United States Patent
Ku et al.

(10) Patent No.: US 12,521,547 B2
(45) Date of Patent: Jan. 13, 2026

(54) ARRHYTHMIA TREATMENT DEVICE AND METHOD FOR TREATING ARRHYTHMIA OF USER BY USING SAME

(71) Applicants: SEOUL NATIONAL UNIVERSITY R&DB FOUNDATION, Seoul (KR); THE INDUSTRY & ACADEMIC COOPERATION IN CHUNGNAM NATIONAL UNIVERSITY, Daejeon (KR)

(72) Inventors: Yunseo Ku, Seoul (KR); Hee Chan Kim, Seoul (KR); Seil Oh, Seoul (KR); Jang Jay Sohn, Seoul (KR)

(73) Assignees: SEOUL NATIONAL UNIVERSITY R&DB FOUNDATION, Seoul (KR); THE INDUSTRY & ACADEMIC COOPERATION IN CHUNGNAM NATIONAL UNIVERSITY, Daejeon (KR)

(*) Notice: Subject to any disclaimer, the term of this patent is extended or adjusted under 35 U.S.C. 154(b) by 328 days.

(21) Appl. No.: 18/325,779

(22) Filed: May 30, 2023

(65) Prior Publication Data
US 2023/0302273 A1 Sep. 28, 2023

Related U.S. Application Data

(63) Continuation of application No. PCT/KR2021/016442, filed on Nov. 11, 2021.

(30) Foreign Application Priority Data

Nov. 30, 2020 (KR) .................. 10-2020-0164688

(51) Int. Cl.
*A61N 1/04* (2006.01)
*A61N 1/36* (2006.01)

(52) U.S. Cl.
CPC .......... *A61N 1/0456* (2013.01); *A61N 1/0472* (2013.01); *A61N 1/36031* (2017.08); *A61N 1/36034* (2017.08)

(58) Field of Classification Search
CPC .............. A61N 1/0456; A61N 1/36031; A61N 1/36034
(Continued)

(56) References Cited

U.S. PATENT DOCUMENTS

2006/0122675 A1 6/2006 Libbus et al.
2009/0054946 A1\* 2/2009 Sommer ............ A61N 1/36185
607/59

(Continued)

FOREIGN PATENT DOCUMENTS

JP 2008522725 A 7/2008
JP 2010527256 A 8/2010
(Continued)

OTHER PUBLICATIONS

Rogala, Tomasz, "European Extended Search Report for EP Application No. 21898447.4", Jul. 5, 2024, EPO, Germany.

*Primary Examiner* — Nadia A Mahmood
(74) *Attorney, Agent, or Firm* — Bridgeway IP Law Group, PLLC; Jihun Kim

(57) ABSTRACT

An arrhythmia treatment device, the device may comprise: a first electrode configured to output a stimulus corresponding to input treatment conditions to electrically stimulate nerves of a user on the basis of the input treatment conditions; a second electrode configured to measure biosignals of the user for a predetermined time interval after the first electrode outputs the stimulus; and a controller configured to check an arrhythmia treatment result of the user on the basis of the biosignals measured for the predetermined time
(Continued)

interval, and to control output of the first electrode based on the checked arrhythmia treatment result.

18 Claims, 12 Drawing Sheets

(58) Field of Classification Search
USPC .......................................................... 607/62
See application file for complete search history.

(56) References Cited

U.S. PATENT DOCUMENTS

2014/0135886 A1   5/2014  Cook et al.
2020/0345970 A1   11/2020  La Rovere et al.

FOREIGN PATENT DOCUMENTS

KR      10-2014-0037803 A    3/2014
KR          10-1566786 B1    11/2015
KR      10-2017-0120114 A    10/2017

* cited by examiner

ARRHYTHMIA TREATMENT DEVICE AND METHOD FOR TREATING ARRHYTHMIA OF USER BY USING SAME

TECHNICAL FIELD

The present disclosure relates to an arrhythmia treatment device and a method for treating arrhythmia of a user by using the same.

This work was supported by the Institute of Information & Communications Technology Planning & Evaluation (IITP) grant funded by the Korean government (Ministry of Science and ICT) (No. 1711121191, "Development of wearable arrhythmia treatment device," under Personal basic research program, Contribution rate: 70/100, Project Coordinator: Seoul National University R&BD Foundation, Project Period: 2020.09.01~2021.08.31).

This work was supported by the Institute of Information & Communications Technology Planning & Evaluation (IITP) grant funded by the Korean government (Ministry of Science and ICT) (No. 1711121191, "Development of an EEG-based Diagnostic Method and a Multimodal Stimulator for Personalized Tinnitus Treatment," under Personal basic research program, Contribution rate: 30/100, Project Coordinator: Chungnam National University, Project Period: 2020.03.01~2021.02.28).

BACKGROUND ART

The human heart repeats contraction and relaxation to supply blood to all parts of the body. For contraction of the heart, it is necessary to apply an electrical stimulus to the heart. To this end, there is an electrical transmission system in the heart which spontaneously generates regular electricity and transmits electrical signals to the entire heart.

Arrhythmia refers to an irregular heartbeat caused by change or malfunction of such an electrical transmission system.

Due to the development of technology, techniques for treating arrhythmia or diagnosing arrhythmia using a wearable device have recently been proposed.

An example is to measure an electrocardiogram through a wearable device worn by a patient and determine whether or not there is arrhythmia. In conventional technologies, a device that applies an electrical stimulus to treat arrhythmia is separated from a device that measures an electrocardiogram to diagnose arrhythmia, resulting in low practicality. In the case of a conventional device capable of applying an electrical stimulus to a patient through the patient's ear, an electrode for electrical stimulation is exposed to the outside from the device, resulting in low treatment efficiency and low usability in public places aesthetically.

DISCLOSURE

Technical Problem

To solve the aforementioned problems, an object of the present disclosure is to provide an arrhythmia treatment device that applies an electrical stimulus to an arrhythmia patient and measures an electrocardiogram according to the electrical stimulus.

Technical objects to be achieved by the present disclosure are not limited to the aforementioned technical objects, and other technical objects not described above may be evidently understood by a person having ordinary skill in the art to which the present disclosure pertains from the following description.

Technical Solution

In accordance with an aspect of the present disclosure, there is provided an arrhythmia treatment device, the device may comprise: a first electrode configured to output a stimulus corresponding to input treatment conditions to electrically stimulate nerves of a user on the basis of the input treatment conditions; a second electrode configured to measure biosignals of the user for a predetermined time interval after the first electrode outputs the stimulus; a memory; and a processor executing one or more instructions stored in the memory, wherein the instructions, when executed by the processor, cause the processor to check an arrhythmia treatment result of the user on the basis of the biosignals measured for the predetermined time interval, control output of the first electrode based on the checked arrhythmia treatment result, obtain an electrocardiogram of the user on the basis of the biosignals measured for the predetermined time interval, compare a pattern of the obtained electrocardiogram of the user with a pattern of an electrocardiogram set as a target for treating arrhythmia of the user and check the arrhythmia treatment result of the user, determine whether to re-output a stimulus through the first electrode according to the arrhythmia treatment result of the user, and control output of the first electrode by resetting the treatment conditions.

The arrhythmia treatment device may be a wearable device that is able to be worn on the body of the user.

The processor may be configured to control at least one of an output intensity of the re-output stimulus and an output time of the re-output stimulus when the stimulus of the first electrode is re-output.

The first electrode may be disposed at facing any one of a portion of a concha and a part of an external auditory meatus of the user when the user wears the arrhythmia treatment device.

The second electrode may be disposed at facing an auticulotemporal nerve of the user when the user wears the arrhythmia treatment device.

The arrhythmia treatment device may include a first earplug wearable on one ear of the user; and a second earplug connected to the first earplug by wire or wirelessly and wearable on the other ear of the user, wherein the first electrode is mounted on the first ear plug, and the second electrode is mounted on at least one of the first ear plug and the second ear plug.

In accordance with another aspect of the present disclosure, there is provided an arrhythmia treatment device, the device may comprise: a common electrode configured to output a stimulus corresponding to input treatment conditions to electrically stimulate nerves of a user on the basis of the input treatment conditions or to measure biosignals of the user for a predetermined time interval; a switch connected to the common electrode; a memory; and a processor executing one or more instructions stored in the memory, wherein the instructions, when executed by the processor, cause the processor to determine an arrhythmia treatment result with respect to the user on the basis of the biosignals measured for the predetermined time interval and to control output of the common electrode based on the checked arrhythmia treatment result, wherein the processor is configured to: obtain an electrocardiogram of the user on the basis of the biosignals measured for the predetermined time interval, compare a pattern of the obtained electrocardiogram of the user with a pattern of an electrocardiogram set as a target for treating arrhythmia of the user and check the arrhythmia treatment result of the user, determine whether to re-output a stimulus through the common electrode according to the arrhythmia treatment result with respect to the user, and control output of the first electrode by resetting the treatment conditions.

In accordance with another aspect of the present disclosure, there is provided an arrhythmia treatment device, the device may comprise: a first electrode included in a structure for pressing a first position inside an external auditory meatus of a user and configured to output a stimulus corresponding to input treatment conditions to electrically stimulate nerves of the user on the basis of the input treatment conditions; a sensor unit positioned apart from the first electrode and configured to measure a first biosignal based on periodic movement of blood vessels distributed at the first position in the ear of the user according to pressing of the first position inside the external auditory meatus of the user for a first predetermined time interval while the first electrode outputs the stimulus; a second electrode configured to measure a second biosignal of the user for a second predetermined time interval after the first electrode outputs the stimulus; a memory; and a processor executing one or more instructions stored in the memory, wherein the instructions, when executed by the processor, cause the processor to control the first electrode to continuously output a stimulus if a heart rate according to the first biosignal is within a preset heart rate range on the basis of the first biosignal measured for the first predetermined time interval, to check an arrhythmia treatment result of the user on the basis of the second biosignal measured for the second predetermined time interval, to control output of the first electrode based on the checked arrhythmia treatment result, and to stop output of the first electrode if the heart rate according to the first biosignal exceeds the preset heart rate range.

The first biosignal may include a signal for measuring the heart rate of the user.

In accordance with another aspect of the present disclosure, there is provided a method of controlling output of an electrode using an arrhythmia treatment device including a memory and a processor, the method may comprise: outputting, by the arrhythmia treatment device, a stimulus corresponding to input treatment conditions to electrically stimulate nerves of a user on the basis of the input treatment conditions; measuring biosignals of the user for a predetermined time interval after the stimulus is output; and checking an arrhythmia treatment result of the user on the basis of the biosignals measured for the predetermined time interval and controlling output of an electrode of based on the checked arrhythmia treatment result, wherein the controlling of output of the electrode comprises: obtaining an electrocardiogram of the user on the basis of the biosignals measured for the predetermined time interval, comparing a pattern of the obtained electrocardiogram of the user with a pattern of an electrocardiogram set as a target for treating arrhythmia of the user and checking the arrhythmia treatment result, determining whether to re-output a stimulus through the electrode according to the arrhythmia treatment result of the user, and resetting the treatment conditions and controlling output of the electrode based on the reset treatment conditions.

In accordance with another aspect of the present disclosure, there is provided a non-transitory computer-readable recording medium storing a computer program, which comprises instructions for a processor to perform a terminal control method, the terminal control method comprise: outputting a stimulus corresponding to input treatment conditions to electrically stimulate nerves of a user on the basis of the input treatment conditions; measuring biosignals of the user for a predetermined time interval after the stimulus is output; and checking an arrhythmia treatment result of the user based on the biosignals measured for the predetermined time interval and controlling output of an electrode on the basis of the arrhythmia treatment result, wherein the controlling of output of the electrode comprises: obtaining an electrocardiogram of the user on the basis of the biosignals measured for the predetermined time interval, comparing a pattern of the obtained electrocardiogram of the user with a pattern of an electrocardiogram set as a target for treating arrhythmia of the user and checking the arrhythmia treatment result of the user, determining whether to re-output a stimulus through the electrode according to the arrhythmia treatment result with respect to the user, and controlling output of the electrode by resetting the treatment conditions.

Advantageous Effects

According to an embodiment of the present disclosure, it is possible to conveniently achieve arrhythmia treatment and diagnosis by providing a wearable device that measures an electrocardiogram according to an electrical stimulus while applying the electrical stimulus to an arrhythmia patient, thereby improving convenience of arrhythmia treatment. In addition, it is possible to safely treat arrhythmia by measuring a heart rate during treatment using an optical sensor, an acceleration sensor, a piezoelectric sensor, and the like in addition to an electrocardiogram.

MODE FOR DISCLOSURE

Figure 1:
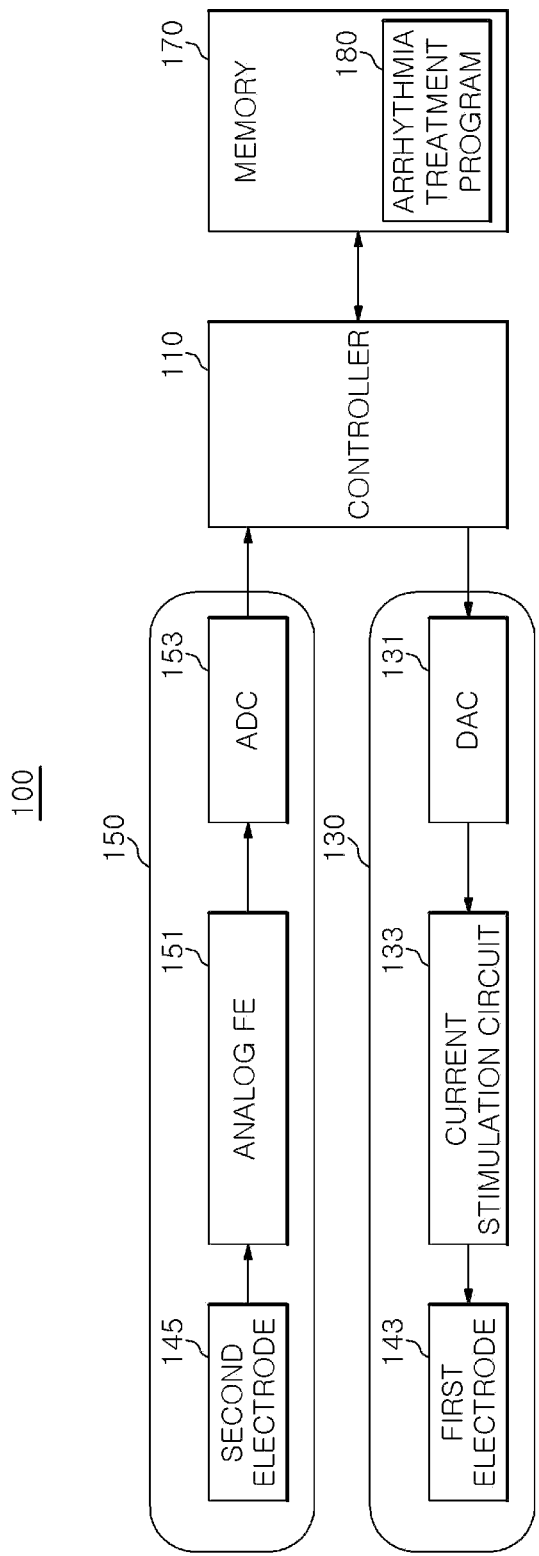
FIG. 1 illustrates an arrhythmia treatment device according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 illustrates an arrhythmia treatment device according to a first embodiment of the present disclosure.

Referring to FIG. 1, the arrhythmia treatment device 100 may include a controller 110, a stimulation unit 130, a measurement unit 150, and a memory 170.

The arrhythmia treatment device 100 may be a wearable device that can be worn on a user's body. For example, the arrhythmia treatment device 100 may be implemented in the form of earphones or a headphone that can be attached to user's ears.

The controller 110 may control the stimulation unit 130 and the measurement unit 150 and execute an arrhythmia treatment program 180 stored in the memory 170. The controller 110 may be called a processor, a microcontroller, a microcontroller unit (MCU), and the like.

The stimulation unit 130 may output an electrical stimulus (e.g., an electrical stimulus for arrhythmia treatment) for stimulating a user's body part (e.g., nerve) according to the control of the controller 110 (or preset treatment conditions). To this end, the stimulation unit 130 may include a digital analog converter (DAC) 131, a current stimulation circuit 133, and a first electrode 143.

The stimulation unit 130 may receive a signal from the controller 110 and provide a current stimulus for arrhythmia treatment to the user based on the received signal. Alternatively, the stimulation unit 130 may provide a current stimulus to the user according to preset arrhythmia treatment conditions.

The controller 110 checks an arrhythmia treatment result with respect to the user based on biosignals measured during a predetermined time interval and controls output of the first electrode 143 based on the result.

Here, control of output of the first electrode includes determining whether to re-output a stimulus through the first electrode according to the arrhythmia treatment result with respect to the user, and when the stimulus is re-output, controlling at least one of an output intensity and output time of the re-output stimulus.

Accordingly, the stimulation unit 130 may determine the magnitude, provision time interval and/or provision time of the electric stimulus on the basis of a signal received from the controller 110 and provide the electrical stimulus to the user according to the determination.

The DAC 131 may convert the signal (digital signal) received from the controller 110 into an analog signal.

The current stimulation circuit 133 may generate a current stimulus to be provided to the user through the first electrode 143 under the control of the controller 110. The current stimulation circuit 133 may generate a current stimulus to be provided to the user through the first electrode 143 based on the analog signal converted by the DAC 131.

The current stimulation circuit 133 may transfer the generated current stimulus to the first electrode 143.

The first electrode 143 outputs a stimulus corresponding to input treatment conditions to electrically stimulate the user's nerves based on the input treatment conditions. Specifically, the first electrode 143 may be used to stimulate the user's nerves (e.g., vagus nerve) using the current stimulus generated by the current stimulation circuit 133. The first electrode 143 may also be called a stimulation electrode.

The measurement unit 150 may include a second electrode 145, an analog front-end (FE) 151, and an analog digital converter (ADC) 153.

The second electrode 145 measures biosignals of the user for a predetermined time interval after the first electrode outputs the stimulus. Here, the biosignals mean electrical signals generated according to the user's heartbeat, and the controller 110 obtains and monitors an electrocardiogram (ECG) of the user based on the biosignals measured for the predetermined time interval. The second electrode 145 may also be called a measurement electrode or an electrocardiogram measurement electrode.

Signals monitored (collected) through the second electrode 145 may be transferred to the controller 110 through the analog FE 151 and the ADC 153.

The analog FE 151 may amplify the ECG of the user monitored through the second electrode 145.

The ADC 153 may convert the biological signals of the user amplified by the analog FE 151 into digital signals that can be used by the controller 110.

The controller 110 obtains the electrocardiogram of the user based on the biosignals measured for the predetermined time interval, compares the obtained electrocardiogram of the user with a target electrocardiogram to check arrhythmia treatment results, and modifies the treatment conditions by controlling at least one of the output intensity, output time, and output of stimulus through the first electrode according to the arrhythmia treatment results with respect to the user.

Here, the electrocardiogram of the user is an electrocardiogram after the user receives a stimulus through the first electrode, and the target electrocardiogram is an electrocardiogram in an ideal state in which arrhythmias has been alleviated.

The controller 110 compares patterns of the electrocardiogram of the user and the target electrocardiogram and determines whether to additionally apply, change, or stop stimulation. Here, the electrocardiogram pattern includes a PR segment, an ST segment, a P-R interval, a QRS interval, a Q-T interval, and an isoelectric line, which are obtained in such a manner that the magnitudes and directions of currents obtained by amplifying electrical signals according to the heartbeat measured around the ears are measured and recorded.

More specifically, the controller 110 may load the arrhythmia treatment program 180 from the memory 170 and determine arrhythmia treatment conditions (that is, conditions of a current stimulus to be output from the stimulation unit 130) for the user from the received electrocardiogram using the loaded arrhythmia treatment program 180. For example, the controller 110 may modify (update) arrhythmia treatment conditions previously set in the stimulation unit 130 (or arrhythmia treatment conditions previously transmitted by the controller 110) to newly determined arrhythmia treatment conditions. In addition, the first electrode may output a stimulus corresponding to the modified treatment conditions.

To this end, the memory 170 may include the arrhythmia treatment program 180 including a series of instructions for determining a current stimulus to stimulate the user's nerves and measuring change in the electrocardiogram according to the current stimulus and information used for execution of the arrhythmia treatment program 180.

The controller 110 may transmit the newly determined arrhythmia treatment conditions to the stimulation unit 130. The stimulation unit 130 may determine a current stimulus for stimulating the user's nerves on the basis of the newly received arrhythmia treatment conditions and output the determined current stimulus through the first electrode 143.

According to the embodiment, the controller 110 may cumulatively store the received electrocardiograms in the memory 170. According to the embodiment, the user's electrocardiogram stored in the memory 170 may be loaded by another external device (e.g., a tablet, a smartphone, a PC, another wearable device, or the like)(not shown) and used for the other external device (not shown) to monitor the user's electrocardiogram (or change in the electrocardiogram).

The controller 110 may load the arrhythmia treatment program 180 and information used for execution of the arrhythmia treatment program 180 stored in the memory 170 in order to execute the arrhythmia treatment program 180.

Figure 2:
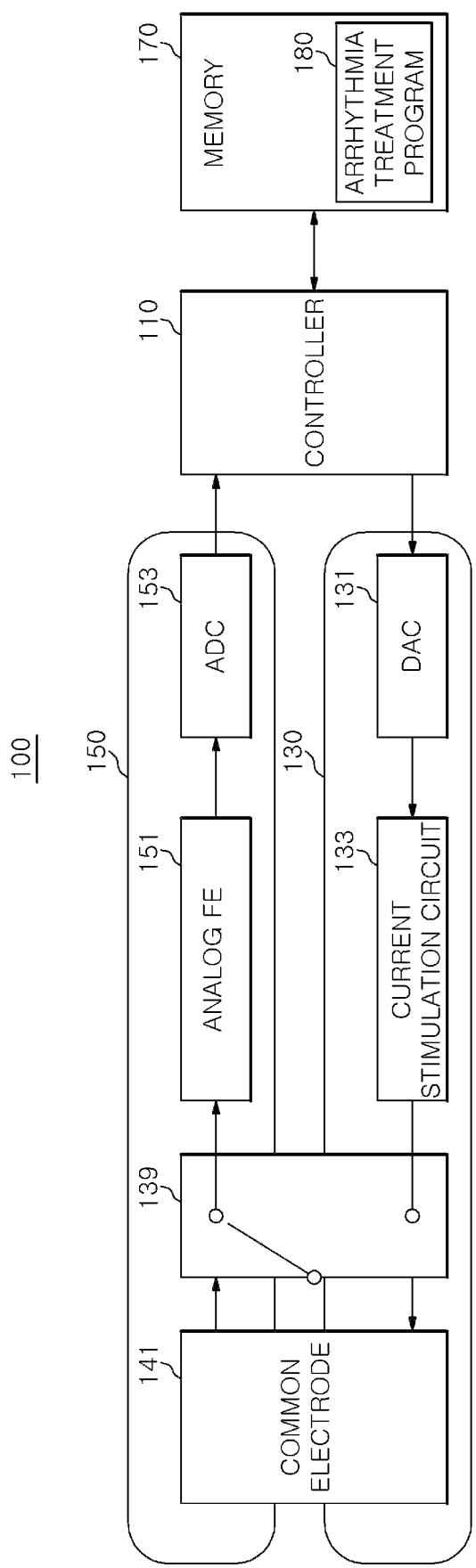
FIG. 2 illustrates an arrhythmia treatment device according to another embodiment of the present disclosure.

FIG. 2 illustrates an arrhythmia treatment device according to a second embodiment of the present disclosure.

Referring to FIG. 2, the arrhythmia treatment device 100 according to the second embodiment may include a controller 110, a stimulation unit 130, a measurement unit 150, and a memory 170.

The controller 110, the memory 170, the DAC 131 included in the stimulation unit 130, and the ADC 153 included in the measurement unit 150 shown in FIG. 2 have the same functions as those of the controller 110, the memory 170, the DAC 131, and the ADC 153 shown in FIG. 1. Therefore, for description of the controller 110, the memory 170, the DAC 131, and the ADC 153 shown in FIG. 2, description of the controller 110, the memory 170, the DAC 131, and the ADC 153 will be used.

A common electrode 141 outputs a stimulus corresponding to input treatment conditions to electrically stimulate the user's nerves on the basis of the treatment conditions, or measures biosignals of the user for a predetermined time interval.

The common electrode 141 may be connected to a switch 139 to perform the same function as the first electrode 143 shown in FIG. 1 according to switching of the switch 139 or connected to the switch 139 to perform the same function as the second electrode 145 and used to stimulate the vagus nerve of the user according to control of the stimulation unit 130 or used to monitor the user's electrocardiogram according to control of the measurement unit 150.

The common electrode 141 of the second embodiment shown in FIG. 2 may execute the function of the first electrode 143 or the second electrode 145 of the first embodiment shown in FIG. 1 according to whether the switch 139 is switched.

Comparing the first electrode 143 and the second electrode 145, although the second electrode 145 may be less effective than the first electrode 143 in providing a current stimulus to the user, the second electrode 145 can also provide a current stimulus to the user. In addition, the first electrode 143 may be less effective than the second electrode 145 in detecting biosignals of the user, but the first electrode 143 can also measure the user's electrocardiogram.

Accordingly, in order to treat arrhythmia of the user, the arrhythmia treatment device 100 may include the first electrode 143 or the second electrode 145 as the common electrode 141.

The switch 139 may be positioned between the common electrode 141, the current stimulation circuit 133 of the stimulation unit 130, and the analog FE 151 of the measurement unit 150 and connect the common electrode 141 to the current stimulation circuit 133 of the stimulation unit 130 to the current stimulation circuit 133 or to the analog FE 151 of the measurement unit 150.

More specifically, the switch 139 may connect the common electrode 141 to any one of the current stimulation circuit 133 and the analog FE 151 under the control of the controller 110.

For example, when the controller 110 instructs the stimulation unit 130 to stimulate the user, the switch 139 may switch connection such that the common electrode 141 is connected to the current stimulation circuit 133.

On the other hand, when the controller 110 instructs the measurement unit 150 to monitor the user's electrocardiogram, the switch 139 may switch internal connection such that the common electrode 141 is connected to the analog FE 151.

The current stimulation circuit 133 may generate a current stimulus to be provided to the user on the basis of the analog signal converted by the DAC 131 and transfer the generated current stimulus to the common electrode 141 through the switch 139.

The analog FE 151 may receive the user's electrocardiogram monitored using the common electrode 141 through the switch 139 and amplify the received biosignals of the user.

Figure 3:
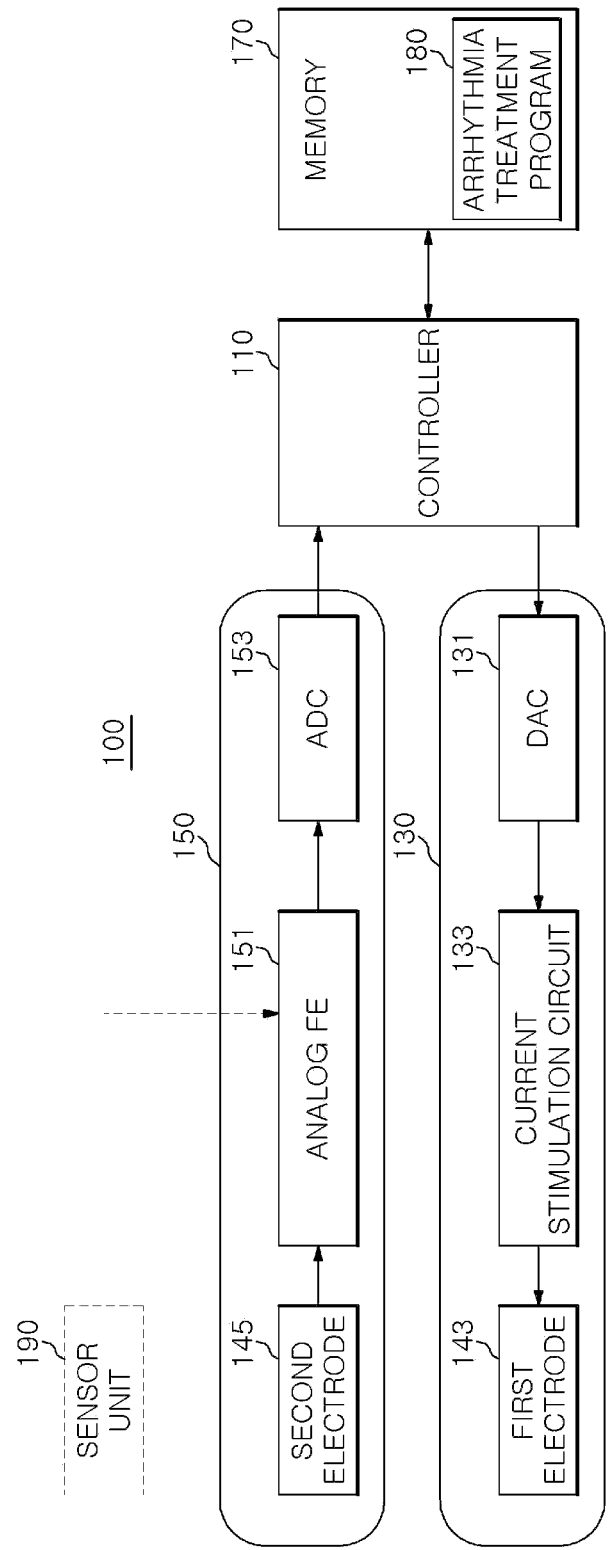
FIG. 3 illustrates an arrhythmia treatment device according to another embodiment of the present disclosure.

FIG. 3 illustrates an arrhythmia treatment device according to a third embodiment of the present disclosure.

Referring to FIG. 3, the arrhythmia treatment device 100 according to the third embodiment may include a controller 110, a stimulation unit 130, a measurement unit 150, a memory 170, and a sensor unit 190.

The controller 110, the memory 170, the DAC 131 included in the stimulation unit 130, and the ADC 153 included in the measurement unit 150 shown in FIG. 3 may have the same functions as those of the controller 110, the memory 170, the DAC 131, and ADC 153 shown in FIG. 1. Therefore, for description of the controller 110, the memory 170, the DAC 131, and the ADC 153 shown in FIG. 2, description of the controller 110, the memory 170, the DAC 131, and the ADC 153 will be used.

The sensor unit 190 measures a first biosignal of the user for a predetermined time interval while the first electrode 143 is outputting the stimulus.

Here, the first biosignal signal includes a signal for measuring the heart rate of the user.

The sensor unit 190 includes a piezoelectric sensor, an acceleration sensor, or an optical sensor, and detects a heart rate by measuring periodic movement of blood vessels during stimulation. In the case of an optical sensor, an analog front end (AFE) is composed of a photodiode and a transimpedance amplifier.

If the detected heart rate is within a normal heart rate range, a stimulus is applied through the first electrode 143, and after stimulation treatment is finished, the electrocardiogram is monitored using the second electrode 145.

On the other hand, if the detected heart rate is out of the normal heart rate range, the treatment is terminated and a visit to the hospital is guided.

Here, criteria for determining arrhythmia are set to a bradycardia heart rate of less than 50 beats per minute and a tachycardia heart rate of 90 beats per minute or more.

The analog FE 151 may amplify the heart rate or electrocardiogram of the user monitored using the sensor unit 190 or the second electrode 145.

Accordingly, the controller 110 determines whether to continue output of the stimulus of the first electrode on the basis of the first biosignal measured during a predetermined time interval, checks an arrhythmia treatment result with respect to the user on the basis of a second biosignal measured during the predetermined time interval, and controls output of the first electrode on the basis of the result.

Figure 4A:
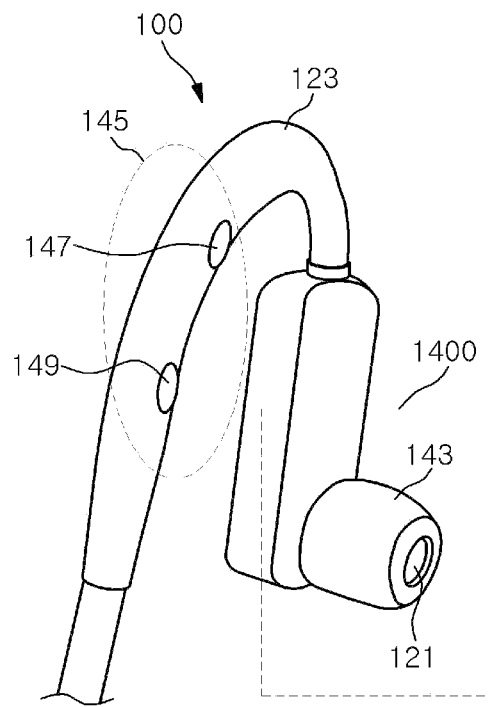
FIGS. 4A to 4D illustrate an example of the structure of the arrhythmia treatment device of the present disclosure.
Figure 4B:
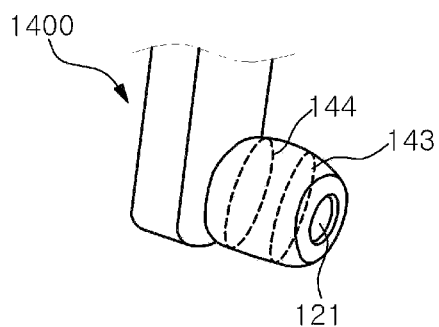
Figure 4C:
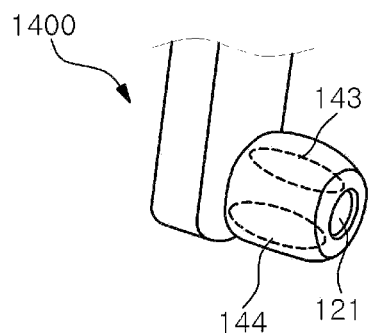
Figure 4D:
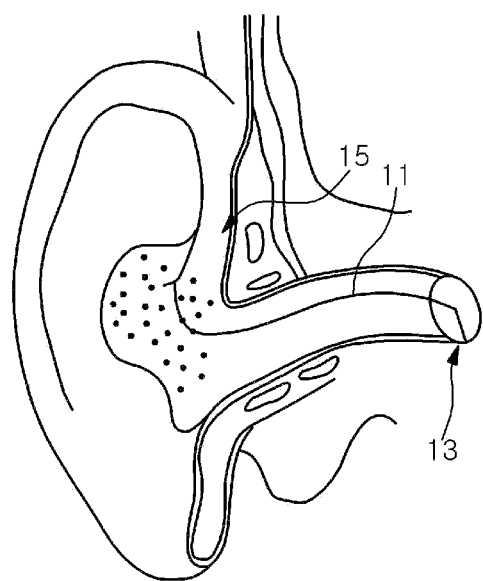
Figure 5:
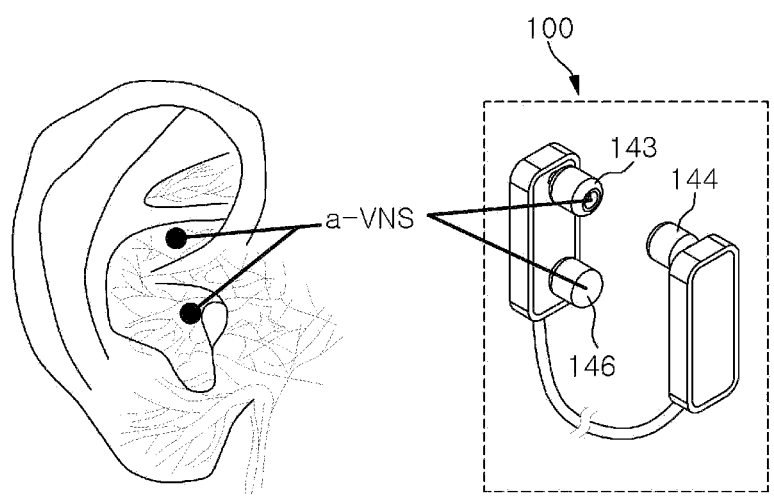
FIG. 5 illustrates another example of the structure of the arrhythmia treatment device of the present disclosure.

FIGS. 4A to 4D illustrate an example of the structure of the arrhythmia treatment device, and FIG. 5 illustrates another example of the structure of an arrhythmia treatment device.

Referring to FIG. 4A, the arrhythmia treatment device 100 may be a headset (or earphone) type device for arrhythmia treatment capable of electrical stimulation and electrocardiogram measurement.

Referring to FIGS. 4B to 4D, the arrhythmia treatment device 100 is based on the fact that a number of branches of the vagus nerve are distributed in the external auditory meatus 11 and may include a structure in which a first electrode 143 and a reference electrode 144 are included as current stimulus applying electrodes that provide an electrical stimulus (current stimulus) to the external auditory meatus 11 based on external ear innervation of the external auditory meatus 11, that is, an electrode unit 1400.

For example, the first electrode 143 may operate as a cathode and the reference electrode 144 may operate as an anode, but they are not limited thereto.

The arrhythmia treatment device 100 may be implemented in various forms that can be mounted on a part of the user's ears, such as an earplug form, a form worn on an ear, a form fixed to a part of an ear, and the like. For example, the electrode unit 1400 may be implemented in the form of an earplug as shown in FIG. 4B or FIG. 4C.

Referring to FIG. 4B. 4, the first electrode 143 and the reference electrode 144 included in the electrode unit 1400 may be positioned spaced apart from each other in a direction parallel to a discharge port 121 in the form of a tip of an earplug mounted in the ear canal of the user when the user wears the arrhythmia treatment device 100. According to another embodiment, referring to FIG. 4C, the first electrode 143 and the reference electrode 144 included in the electrode unit 1400 may be positioned spaced apart from each other in a direction perpendicular to the discharge port 121.

However, FIG. 4B and FIG. 4C are examples of the positions of the first electrode 143 and the reference electrode 144 and they are not limited thereto. That is, according to embodiments, the first electrode 143 and the reference electrode 144 may be disposed at various positions in the electrode unit 1400.

The first electrode 143 may be positioned at a portion in the arrhythmia treatment device 100, which corresponds to the auricular branch of the vagus nerve 13 of the user, when the user wears the arrhythmia treatment device 100.

Referring back to FIG. 4A, the arrhythmia treatment device 100 may further include one or more measurement electrodes 145, 147, and 149 positioned on at least a portion of a cable 123 connected to the first electrode 143.

The one or more measurement electrodes 145, 147, and 149 may be implemented in a portion of the cable 123 such that the one or more measurement electrodes 145, 147, and 149 are positioned on a part of the ear where branches of the user's vagus nerve or trigeminal nerve are distributed when the user wears the arrhythmia treatment device 100.

That is, the one or more measurement electrodes 145, 147, and 149 may be implemented on the part of the cable 123 corresponding to the part of the ear where the branches of the user's vagus nerve or trigeminal nerve are distributed when the user wears the arrhythmia treatment device 100.

According to an embodiment, the one or more measurement electrodes may include a second electrode 145, or a third electrode 147 and a fourth electrode 149 having the same function as the second electrode 145.

The second electrode 145 (or the third electrode 147 and the fourth electrode 149) may be implemented on a part of the cable 123 such that the second electrode 145 (or the third electrode 147 and the fourth electrode 149) is positioned at a portion of the external auditory meatus where a number of branches of the user's vagus nerve or trigeminal nerve are distributed when the user wears the arrhythmia treatment device 100. That is, the second electrode 145 (or the third electrode 147 and the fourth electrode 149) may be implemented on a part of the cable 123 corresponding to the portion of the external auditory meatus where a number of branches of the user's vagus nerve or trigeminal nerve are distributed when the user wears the arrhythmia treatment device 100.

For example, the second electrode 145 (or the third electrode 147 and the fourth electrode 149) may be implemented on a part of the cable 123 such that the second electrode 145 (or the third electrode 147 and the fourth electrode 149) is positioned at a portion corresponding to the user's auticulotemporal nerve 15 when the user wears the arrhythmia treatment device 100.

The cable 123 may be implemented as an element that is changed in shape by an external force and can maintain the changed shape even when the external force is removed, or may be implemented as an elastic element that is changed in shape by the external force but returns to the original shape thereof when the force is removed.

Referring to FIG. 5, the arrhythmia treatment device 100 may be implemented in a predetermined form including one or more electrodes positioned to output a stimulus (current stimulus) to a concha.

For example, the arrhythmia treatment device 100 may be implemented based on the structure of the auricle of the user and may include two-channel electrodes (e.g., a first electrode 143 and a fifth electrode 146) that provide a current stimulus to the user. Here, the first electrode 143 and the fifth electrode 146 may operate as cathodes, but they are not limited thereto.

In addition, the arrhythmia treatment device 100 may be used while changing the first electrode 143 and the fifth electrode 146 according to the stimulation effect of the electrodes providing current stimulation.

The arrhythmia treatment device 100 may further include a reference electrode 144 for current stimulation and measurement of user's biosignals. During current stimulation, the reference electrode 144 may operate as an anode, but is not limited thereto.

The first electrode 143 and the fifth electrode 146 may be implemented in parts of the arrhythmia treatment device 100 such that the first electrode 143 and the fifth electrode 146 are positioned on the auricular branch of the vagus nerve (aVNS) of the user when the user wears the arrhythmia treatment device 100. That is, the first electrode 143 and the fifth electrode 146 may be implemented in parts of the arrhythmia treatment devices 100, which correspond to the auricular branches of vagus nerve of the user, when the user wears the arrhythmia treatment device 100.

Figure 6:
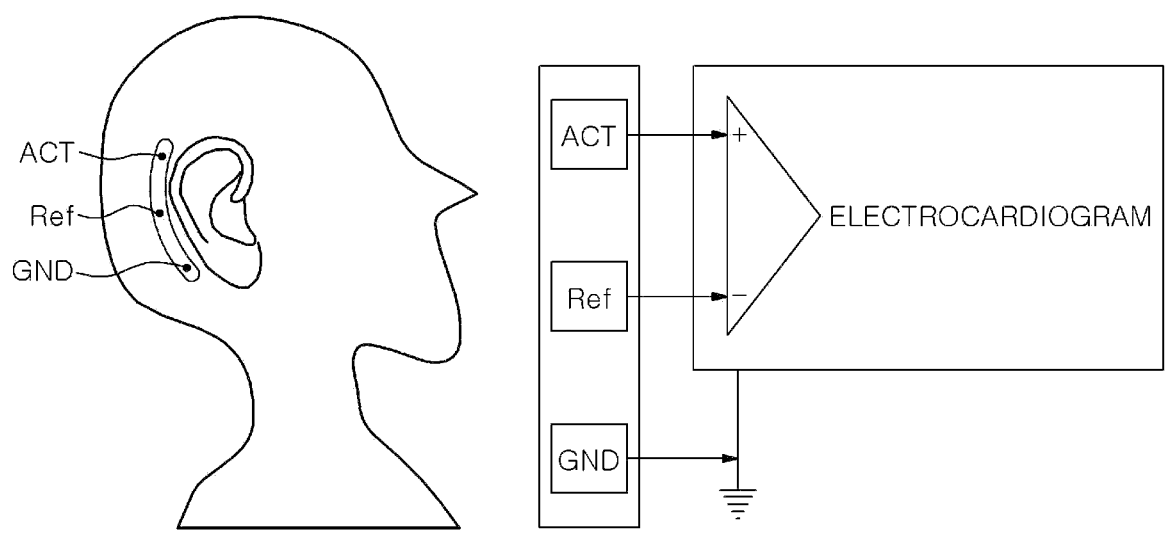
FIG. 6 illustrates an example of measuring an electrocardiogram when the arrhythmia treatment device of the present disclosure is mounted on a single ear.
Figure 7:
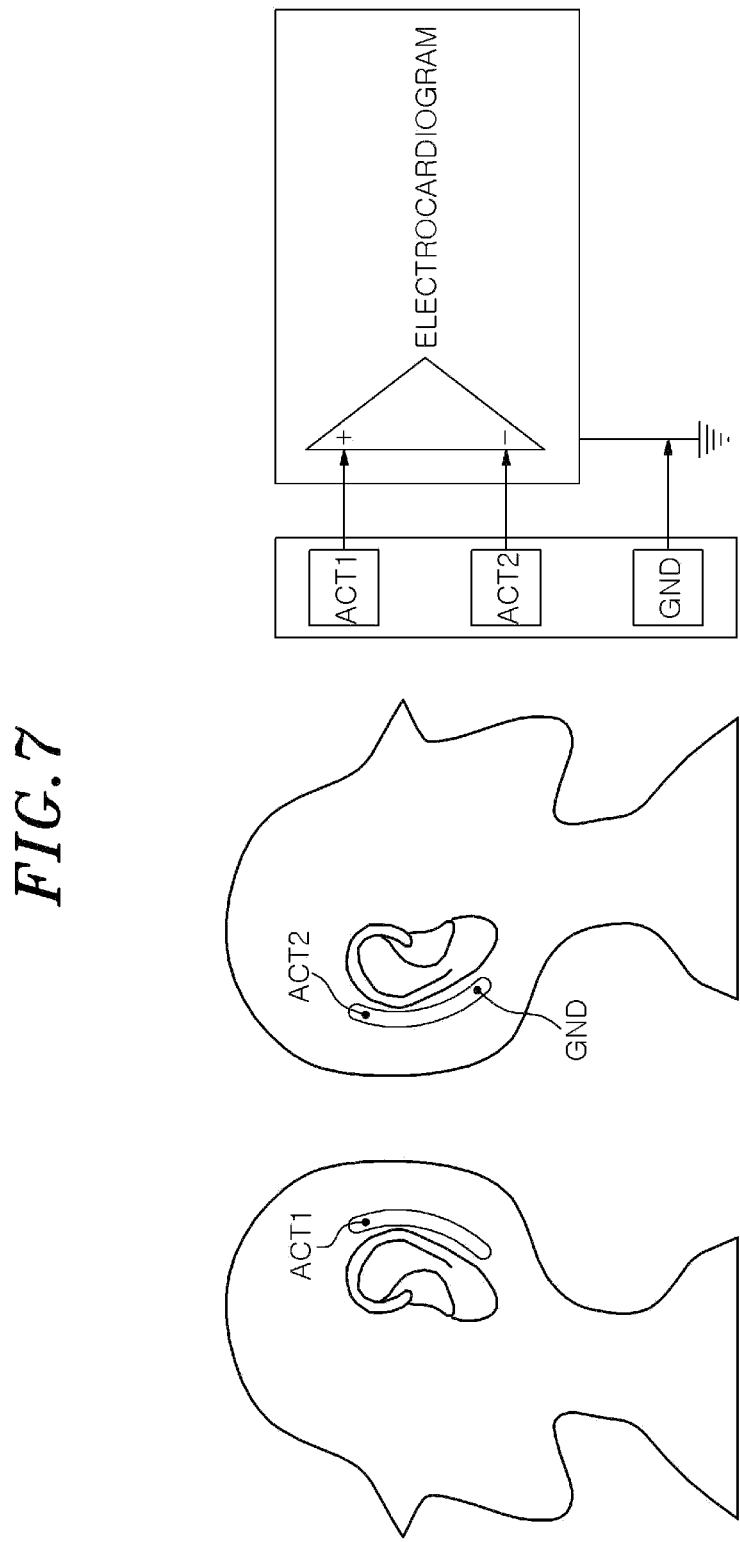
FIG. 7 illustrates an example of measuring an electrocardiogram when the arrhythmia treatment device of the present disclosure is mounted on both ears.

FIG. 6 illustrates an example of measuring an electrocardiogram when the arrhythmia treatment device is mounted on one ear (single ear), and FIG. 7 illustrates an example of measuring an electrocardiogram when the arrhythmia treatment device is mounted on both ears.

Referring to FIG. 6, when the arrhythmia treatment device 100 is mounted on only one ear (e.g., the right ear) of a user, the arrhythmia treatment device 100 may include a measurement electrode ACT, a reference electrode Ref, and a ground electrode GND in order to measure an electrocardiogram.

Here, the measurement electrode ACT may operate as an anode and the reference electrode Ref may operate as a cathode.

Referring to FIG. 7, when the arrhythmia treatment device 100 is mounted on both ears of the user, the arrhythmia treatment device 100 may include a first measurement electrode ACT1, a second measurement electrode ACT2, and a ground electrode GND.

The first measurement electrode ACT1 and the second measurement electrode ACT2 may be mounted on different ears of the user. For example, when the first measurement electrode ACT1 is mounted on the user's left ear, the second measurement electrode ACT2 may be mounted on the user's right ear. In this case, the first measurement electrode ACT1 may operate as an anode and the second measurement electrode ACT2 may operate as a cathode.

Figure 8:
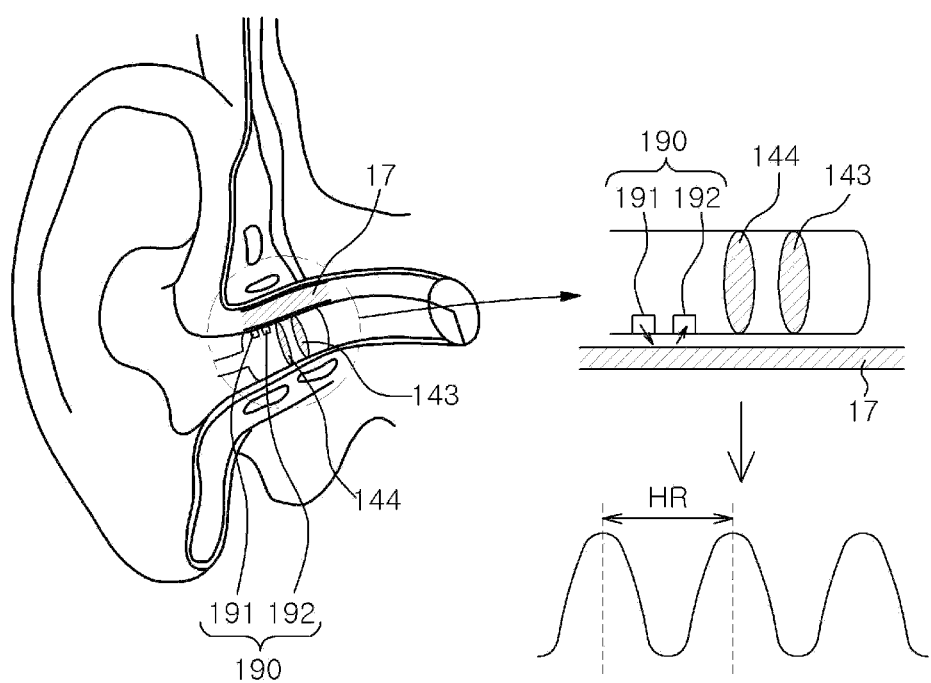
FIG. 8 illustrates an example of measuring a heart rate when the arrhythmia treatment device of the present disclosure is mounted on a single ear.

FIG. 8 illustrates an example of measuring a heart rate when the arrhythmia treatment device is mounted on a single ear.

Referring to FIG. 8, when the arrhythmia treatment device 100 is mounted only on one ear (e.g., the right ear) of a user, the arrhythmia treatment device 100 may include a measurement electrode (ACT) 143, a reference electrode (Ref) 144, a ground electrode GND, and a sensor unit 190 in order to measure an electrocardiogram.

Here, the measurement electrode ACT may operate as an anode and the reference electrode Ref may operate as a cathode.

When the arrhythmia treatment device 100 is mounted only on one ear (e.g., the right ear) of the user, a blood vessel 17 in contact with the arrhythmia treatment device may be physically pressed.

Accordingly, the sensor unit 190 may measure a heart rate using contraction and expansion of the blood vessel 17 according to heartbeat.

The sensor unit 190 includes a piezoelectric sensor, an acceleration sensor, or an optical sensor and detects a heart rate by measuring periodic movement of the blood vessel during stimulation. In the case of an optical sensor, the analog front end (AFE) is composed of a photodiode and a transimpedance amplifier.

Specifically, referring to FIG. 8, the sensor unit 190 may include an LED 191 and a photodiode (PD) 192 and detect a heart rate by measuring periodic movement of blood vessels.

It is possible to measure physical changes in blood vessels as well as biopotential signals by adding a structure for measuring a heart rate using an acceleration sensor, a piezoelectric sensor, or an optical sensor (particularly, an optical sensor), enabling heart rate measurement during electrical stimulation. This has the effect of a safety device to stop stimulation if a heart rate is excessively high or low during stimulation.

Figure 9:
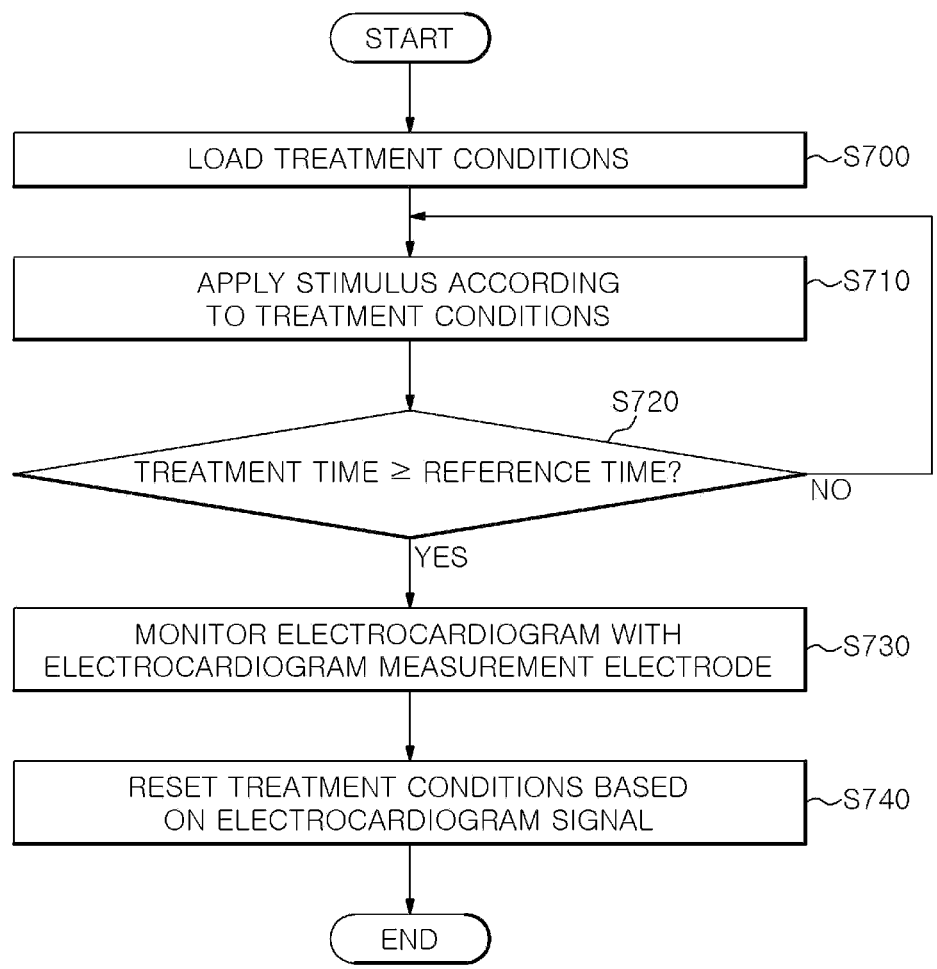
FIG. 9 is an exemplary flowchart illustrating a method of providing a stimulation current to a user and monitoring an electrocardiogram using the arrhythmia treatment device of the present disclosure.

FIG. 9 shows an example of a flowchart illustrating a method of providing a stimulation current to a user and monitoring an electrocardiogram using the arrhythmia treatment device of the present disclosure.

Referring to FIG. 9, the stimulation unit 130 may load (or receive) treatment conditions stored in the memory 170 (S700). The treatment conditions may include at least one of a magnitude, a provision time interval, and a provision time of a current stimulus.

The stimulation unit 130 may apply a stimulus to a part of the user's body (e.g., ear) on the basis of predetermined treatment conditions (S710).

The stimulation unit 130 may compare the time at which the stimulus is applied (treatment time) with a preset reference time (S720), and if the treatment time is equal to or longer than the preset reference time ("Yes" in S720), end (stop) application of a current stimulus.

When the stimulation unit 130 ends current stimulation, the measurement unit 150 may monitor the user's electrocardiogram (S730).

The controller 110 may reset treatment conditions to be provided to the stimulation unit 130 based on the electrocardiogram received from the measurement unit 150 (S740). Here, the controller 110 may monitor the electrocardiogram to determine whether the arrhythmia treatment using current stimulation is effective, and reset treatment conditions according to the determination result.

Thereafter, the stimulation unit 130 may load the reset treatment conditions and may re-perform steps S700 to S740.

Figure 10:
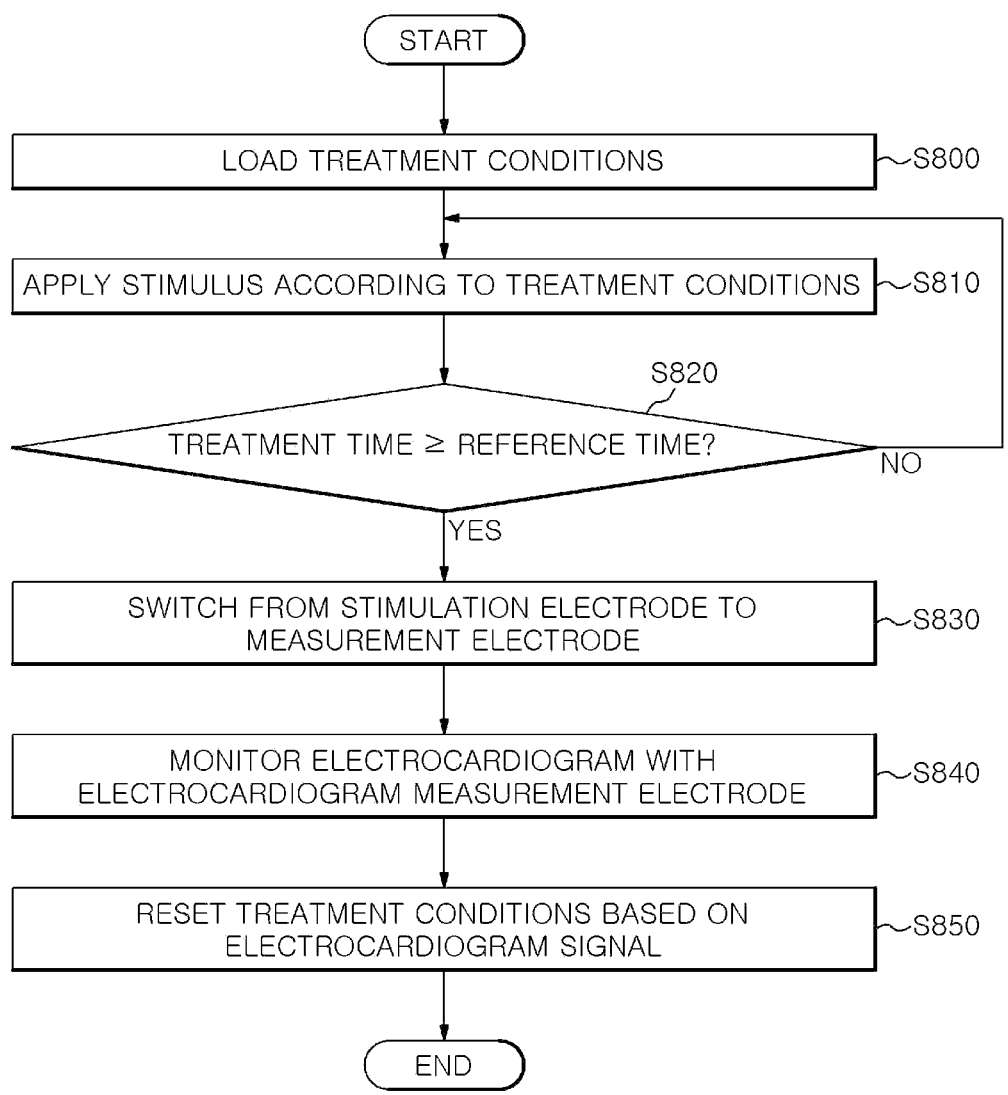
FIG. 10 is another exemplary flowchart illustrating a method of providing a stimulation current to a user and monitoring an electrocardiogram using the arrhythmia treatment device of the present disclosure.

FIG. 10 is another example of a flowchart illustrating a method of providing a stimulation current to a user and monitoring an electrocardiogram using the arrhythmia treatment device of the present disclosure.

Referring to FIG. 10, the stimulation unit 130 may load (or receive) treatment conditions stored in the memory 170 (S800).

The stimulation unit 130 may apply a stimulus to a part of the user's body (e.g., ear) based on predetermined treatment conditions (S810).

The stimulation unit 130 compares the time at which the stimulus is applied (treatment time) with a preset reference time (S820), and if the treatment time is equal to or longer than the preset reference time ("Yes" in S820), end (stop) application of a current stimulus.

When the stimulation unit 130 ends current stimulation, the switch 139 performs switching such that the common electrode 141 is connected to the measurement unit 150 (i.e., the switch 139 switches from the stimulation electrode to the measurement electrode) (S830), the measurement unit 150 may monitor the user's electrocardiogram (S840).

The controller 110 may reset treatment conditions to be provided to the stimulation unit 130 based on the electrocardiogram received from the measurement unit 150 (S850). Here, the controller 110 may monitor the electrocardiogram to determine whether the arrhythmia treatment using current stimulation is effective, and reset treatment conditions according to the determination result.

Thereafter, the stimulation unit 130 may load the reset treatment conditions and may re-perform steps S800 to S850.

Figure 11:
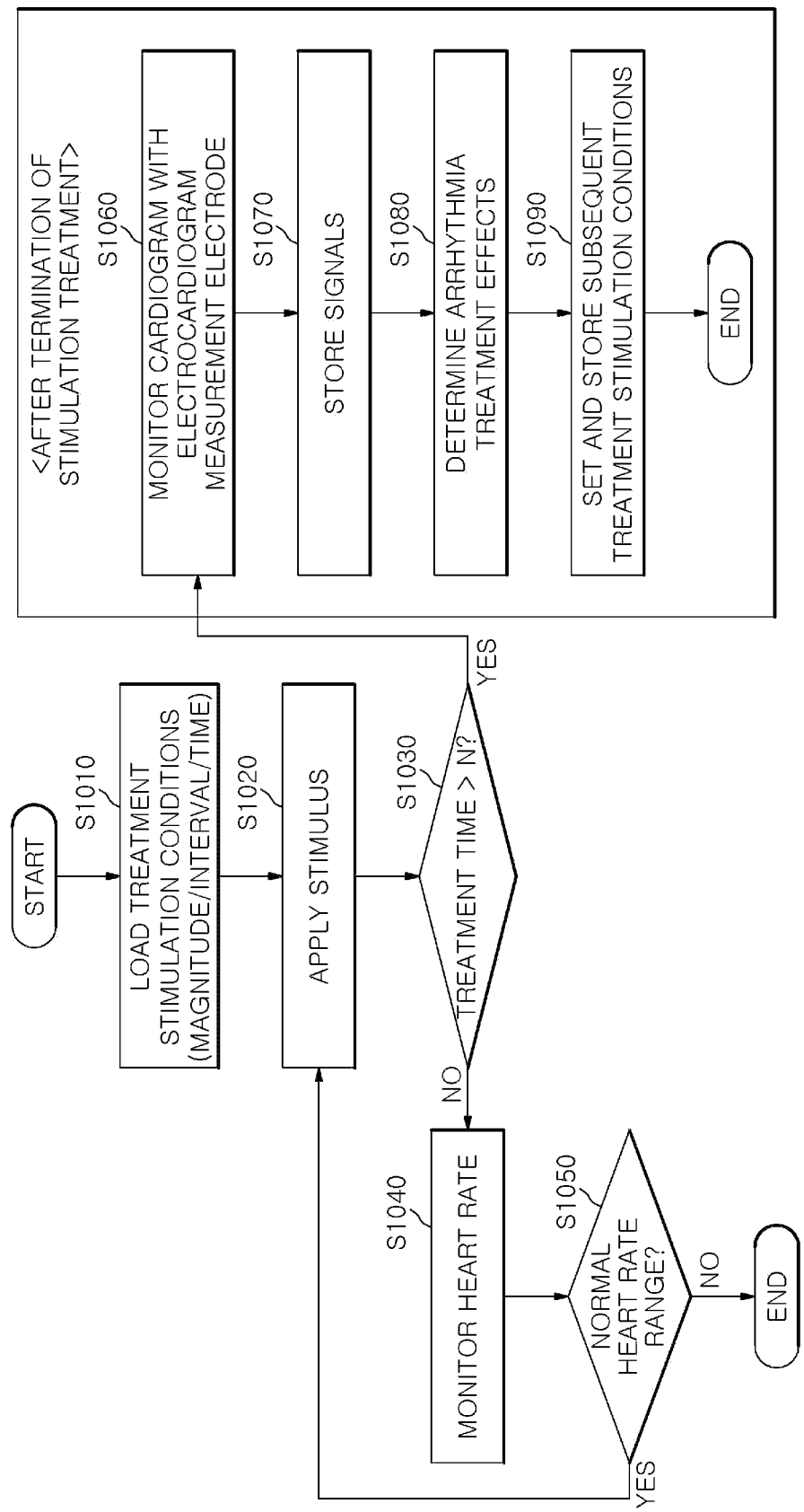
FIG. 11 is a flowchart illustrating a method of providing a stimulation current to a user, measuring a heart rate, and then monitoring an electrocardiogram using the arrhythmia treatment device of the present disclosure.

FIG. 11 is a flowchart illustrating a method of providing stimulation current to a user, measuring a heart rate, and then monitoring an electrocardiogram using the arrhythmia treatment device of the present disclosure.

Referring to FIG. 11, the stimulation unit 130 may load (or receive) treatment conditions stored in the memory 170 (S1010).

The stimulation unit 130 may apply a stimulus to a part of the user's body (e.g., ear) based on predetermined treatment conditions (S1020).

The stimulation unit 130 compares the time at which the stimulus is applied (treatment time) with a preset reference time (S1030), and if the treatment time is equal to or longer than the preset reference time ("Yes" in S1030), end (stop) application of a current stimulus.

If the treatment time is less than the preset reference time ("No" in S1030), the heart rate is monitored through the sensor unit 190 (S1040).

If the heart rate is within a preset heart rate range ("Yes" in S1050), a stimulus is continuously applied.

If the heart rate exceeds the preset heart rate range ("No" in S1050), the stimulation treatment may be terminated (stopped).

After the stimulation treatment is finished in step S1030, the electrocardiogram is monitored with an electrocardiogram measurement electrode (S1060).

Thereafter, signals are stored (S1070), and the arrhythmia treatment effect is determined (S1080). Depending on the arrhythmia treatment effect, subsequent treatment stimulation conditions are reset and stored (S1090).

Figure 12:
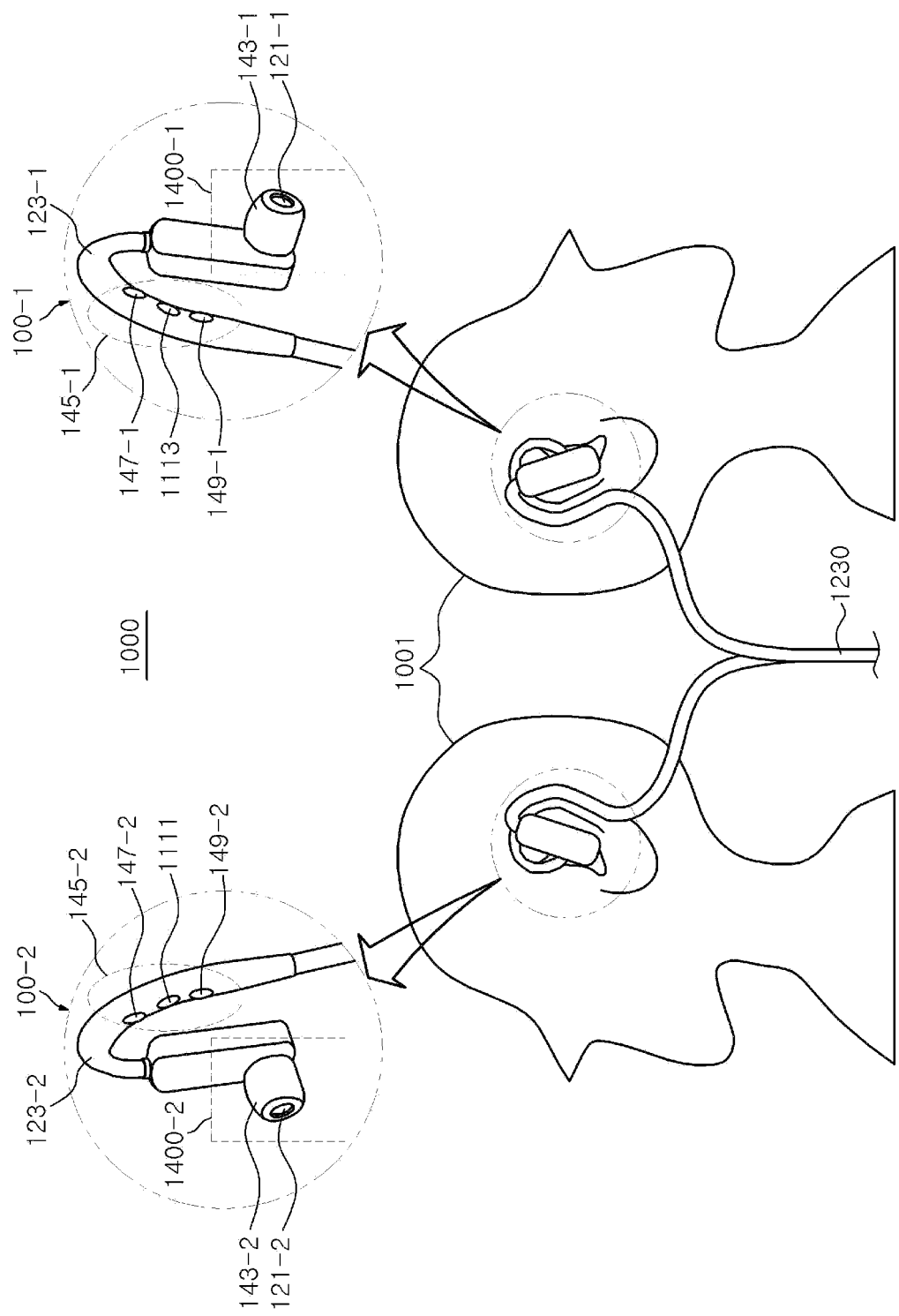
FIG. 12 is a diagram for describing the structure of a binaural type arrhythmia treatment device according to an embodiment of the present disclosure.

FIG. 12 is a diagram for describing the structure of a binaural type arrhythmia treatment device according to an embodiment of the present disclosure.

Referring to FIG. 12, the binaural type arrhythmia treatment device 1000 includes two devices (e.g., an earplug type, a type that is worn on an ear, a type that is fixed to a part of the ear, or the like) each including a stimulation electrode (e.g., a first electrode 143) capable of outputting a current stimulus and a measurement electrode (e.g., a second electrode 145 or a third electrode 147 and a fourth electrode 149) capable of measuring biosignals (electrocardiogram) of a user, which can be respectively worn on the right ear and the left ear of the user.

Accordingly, it is possible to measure the user's electrocardiogram with a combination of the stimulation electrode and the left and right measurement electrodes in the binaural form.

The device 1000 may include a cable 1230, a first device 100-1, and a second device 100-2.

The first device 100-1 may include a first electrode unit 1400-1 including a first stimulation electrode 143-1 and a first reference electrode (not shown), a first cable 123-1 connected to a portion of the first stimulation electrode 143-1, and a first measurement electrode 145-1 positioned on at least a portion of the first cable 123-1. The first measurement electrode 145-1 may include a third right electrode 147-1, a fourth right electrode 149-1, and a fourth reference electrode 1113.

The second device 100-2 may include a second electrode unit 1400-2 including a second stimulation electrode 143-2 and a second reference electrode (not shown), a second cable 123-2 connected to a portion of the second stimulation electrode 143-2, and a second measurement electrode 145-2 positioned on at least a portion of the second cable 123-2. The second measurement electrode 145-2 may include a third left electrode 147-2, a fourth left electrode 149-2, and a third reference electrode 1111.

The first stimulation electrode 143-1 and the second stimulation electrode 143-2 may correspond to the first electrode 143 of FIG. 4, the first reference electrode and the second reference electrode may correspond to the reference electrode 144 of FIG. 4, and the first electrode unit 1400-1 and the second electrode unit 1400-2 may correspond to the electrode unit 1400 of FIG. 4.

In addition, the first cable 123-1 and the second cable 123-2 may correspond to the cable 123 of FIG. 4, the first measurement electrode 145-1 and the second measurement electrode 145-2 may corresponds to the second electrode 145 of FIG. 4, the third right electrode 147-1 and the third left electrode 147-2 may correspond to the third electrode 147 of FIG. 4, and the fourth right electrode 149-1 and the fourth left electrode 149-2 may correspond to the fourth electrode 149 of FIG. 4.

The cable 1230 may be electrically connected to the first cable 123-1 of the first device 100-1 and electrically connected to the second cable 123-2 of the second device 100-2.

Meanwhile, it may be more efficient that a separation distance between the third right electrode 147-1 and the fourth right electrode 149-1 and a separation distance between the third left electrode 147-2 and the fourth left electrode 149-2 be maximized for biosignal measurement.

An object of the present disclosure is to provide an arrhythmia treatment device that applies an electrical stimulus to an arrhythmia patient and measures an electrocardiogram according to the electrical stimulus. According to an embodiment of the present disclosure, it is possible to provide a wearable device capable of measuring an electrocardiogram of an arrhythmia patient according to an electrical stimulus while applying the electrical stimulus to the patient to conveniently perform arrhythmia treatment and diagnosis, thereby improving the convenience of arrhythmia treatment.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

The invention claimed is:

1. An arrhythmia treatment device comprising:
 a first electrode configured to output a stimulus corresponding to input treatment conditions to electrically stimulate nerves of a user based on the input treatment conditions;
 a second electrode configured to measure biosignals of the user for a predetermined time interval after the first electrode outputs the stimulus;
 a memory; and
 a processor executing one or more instructions stored in the memory, wherein the instructions, when executed by the processor, cause the processor to check an arrhythmia treatment result of the user based on the biosignals measured for the predetermined time interval,
 control output of the first electrode based on the checked arrhythmia treatment result,
 obtain an electrocardiogram of the user based on the biosignals measured for the predetermined time interval,
 compare a pattern of the obtained electrocardiogram of the user with a pattern of an electrocardiogram set as a target for treating arrhythmia of the user and check the arrhythmia treatment result of the user,
 determine whether to re-output the stimulus through the first electrode according to the arrhythmia treatment result of the user, and
 control output of the first electrode by resetting the treatment conditions,
 wherein the arrhythmia treatment device is a wearable device that is able to be worn on a body of the user.

2. The arrhythmia treatment device of claim 1, wherein the processor is configured to control an output intensity of the stimulus or an output time of the stimulus when the stimulus of the first electrode is re-output.

3. The arrhythmia treatment device of claim 1, wherein the first electrode is disposed at facing a portion of a concha or a part of an external auditory meatus of the user when the user wears the arrhythmia treatment device.

4. The arrhythmia treatment device of claim 1, wherein the second electrode is disposed at facing an auriculotemporal nerve of the user when the user wears the arrhythmia treatment device.

5. The arrhythmia treatment device of claim 1, further comprising:
 a first earplug wearable on a first ear of the user; and
 a second earplug connected to the first earplug by wire or wirelessly and wearable on a second ear of the user,
 wherein the first electrode is mounted on the first earplug, and the second electrode is mounted on at least one of the first earplug or the second earplug.

6. The arrhythmia treatment device of claim 1, further comprising:
 a common electrode including the first electrode and the second electrode; and
 a switch connected to the common electrode,
 wherein the processor is further configured to control the switch to be connected with the common electrode on a first route for a first predetermined time interval and a second route for a second predetermined time interval.

7. A method of controlling output of an electrode using an arrhythmia treatment device including a memory and a processor, the method comprising:
 outputting, by a first electrode of the arrhythmia treatment device, a stimulus corresponding to input treatment conditions to electrically stimulate nerves of a user based on the input treatment conditions;
 measuring, by a second electrode of the arrhythmia treatment device, biosignals of the user for a predetermined time interval after the stimulus is output;
 checking an arrhythmia treatment result of the user based on the biosignals measured for the predetermined time interval and controlling output of the first electrode based on the checked arrhythmia treatment result;
 obtaining an electrocardiogram of the user based on the biosignals measured for the predetermined time interval;

comparing a pattern of the obtained electrocardiogram of the user with a pattern of an electrocardiogram set as a target for treating arrhythmia of the user and checking the arrhythmia treatment result;

determining whether to re-output the stimulus through the first electrode according to the arrhythmia treatment result of the user; and resetting the treatment conditions and controlling output of the first electrode based on the reset treatment conditions, wherein the first electrode is disposed at facing a portion of a concha or a part of an external auditory meatus of the user when the user wears the arrhythmia treatment device.

8. The method of claim 7, wherein the controlling the output of the first electrode includes controlling an output intensity of the stimulus or an output time of the stimulus when the stimulus of the first electrode is re-output.

9. The method of claim 7, wherein the controlling the output of the first electrode comprises controlling a switch to be connected with a common electrode including the first electrode and the second electrode on a first route for a first predetermined time interval and a second route for a second predetermined time interval.

10. A computer-readable recording medium storing a computer program, the computer program including instructions for causing a processor to perform a method of controlling output of an electrode of an arrhythmia treatment device, when executed by the processor, performs a method comprising:

outputting, by a first electrode of the arrhythmia treatment device, a stimulus corresponding to input treatment conditions to electrically stimulate nerves of a user based on the input treatment conditions;

measuring, by a second electrode of the arrhythmia treatment device, biosignals of the user for a predetermined time interval after the stimulus is output;

checking an arrhythmia treatment result of the user based on the biosignals measured for the predetermined time interval and controlling output of an electrode based on the arrhythmia treatment result;

obtaining an electrocardiogram of the user based on the biosignals measured for the predetermined time interval;

comparing a pattern of the obtained electrocardiogram of the user with a pattern of an electrocardiogram set as a target for treating arrhythmia of the user and checking the arrhythmia treatment result of the user;

determining whether to re-output the stimulus through the first electrode according to the arrhythmia treatment result of the user; and controlling output of the first electrode by resetting the treatment conditions, wherein the arrhythmia treatment device further comprises a first earplug wearable on a first ear of the user, and a second earplug connected to the first earplug by wire or wirelessly and wearable on a second ear of the user, wherein the first electrode is mounted on the first earplug, and the second electrode is mounted on the first earplug or the second earplug.

11. The computer-readable recording medium of claim 10, wherein the controlling the output of the first electrode includes controlling an output intensity of the stimulus or an output time of the stimulus when the stimulus of the first electrode is re-output.

12. The computer-readable recording medium of claim 10, wherein the controlling the output of the first electrode comprises controlling a switch to be connected with a common electrode including the first electrode and the second electrode on a first route for a first predetermined time interval and a second route for a second predetermined time interval.

13. The method of claim 7, wherein the arrhythmia treatment device is a wearable device that is configured to be worn on a body of the user.

14. The method of claim 7, wherein the second electrode is disposed at facing an auriculotemporal nerve of the user when the user wears the arrhythmia treatment device.

15. The method of claim 7, wherein the arrhythmia treatment device further comprises a first earplug wearable on a first ear of the user; and a second earplug connected to the first earplug by wire or wirelessly and wearable on a second ear of the user, wherein the first electrode is mounted on the first earplug, and the second electrode is mounted on the first earplug or the second earplug.

16. The computer-readable recording medium of claim 10, wherein the arrhythmia treatment device is a wearable device that is configured to be worn on a body of the user.

17. The computer-readable recording medium of claim 10, wherein the first electrode is disposed at facing a portion of a concha or a part of an external auditory meatus of the user when the user wears the arrhythmia treatment device.

18. The computer-readable recording medium of claim 10, wherein the second electrode is disposed at facing an auriculotemporal nerve of the user when the user wears the arrhythmia treatment device.

* * * * *